(No Model.)

A. W. CRAM.
ELBOW FOR STOVE-PIPES.

No. 319,884. Patented June 9, 1885.

WITNESSES:
Fred. G. Dieterich
J. E. Prosperi

INVENTOR.
A. W. Cram,
per F. A. Lehmann,
ATTORNEYS.

UNITED STATES PATENT OFFICE.

ALONZO W. CRAM, OF HAVERHILL, MASSACHUSETTS, ASSIGNOR TO ADJUSTABLE ELBOW AND DAMPER COMPANY, OF NASHUA, N. H.

ELBOW FOR STOVE-PIPES.

SPECIFICATION forming part of Letters Patent No. 319,884, dated June 9, 1885.

Application filed December 29, 1884. (No model.)

*To all whom it may concern:*

Be it known that I, ALONZO W. CRAM, of Haverhill, in the county of Essex and State of Massachusetts, have invented certain new and useful Improvements in Elbows for Stove-Pipes; and I do hereby declare the following to be a full, clear, and exact description of the invention, such as will enable others skilled in the art to which it pertains to make and use it, reference being had to the accompanying drawings, which form part of this specification.

My invention relates to an improvement in elbows for stove-pipes; and it consists, first, in the combination of a shallow cylinder, two loosely-revolving heads which are clamped thereto, each one of which has an opening for the stove-pipe, and which openings can be turned either so as to register with each other or into any desired relation; second, in the combination of the cylinder, the heads applied thereto, each one of which is provided with an opening for the stove-pipe, and a damper which will both uncover an opening in one of the heads, so as to admit air into the cylinder, and at the same time partially close one of the stove-pipe holes, and thus regulate the draft, as will be more fully described hereinafter.

The object of my invention is to provide a double elbow for stove-pipes, by means of which the ends of the pipes can be arranged in any desired relation to each other, and thus making either a long or a short elbow, as may be required.

Figure 1:
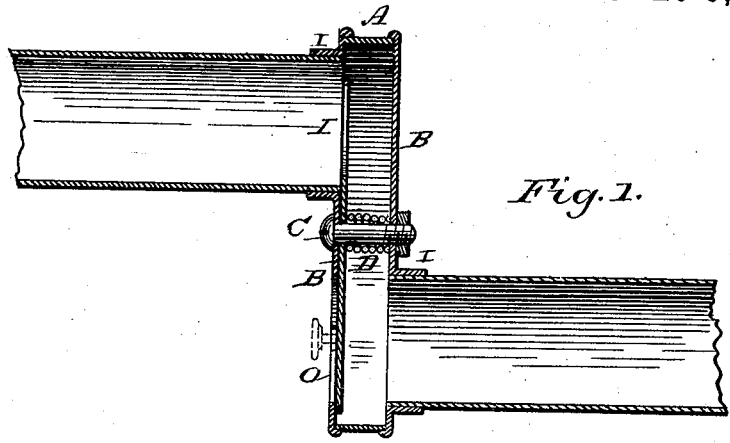
Figure 2:
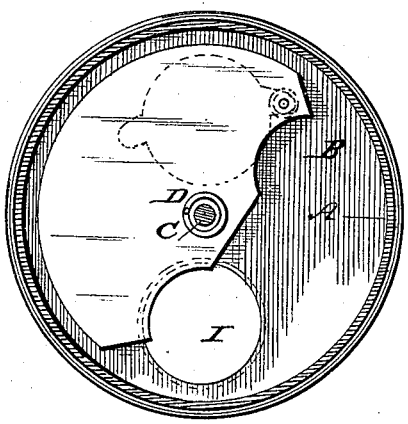
Figure 3:
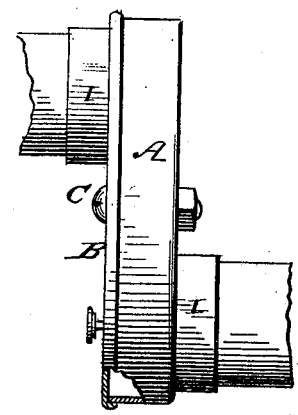
Figure 4:
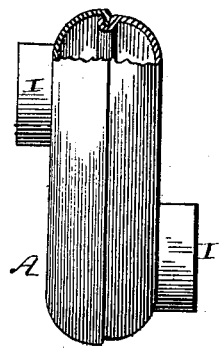

Figure 1 is a vertical section taken through an elbow embodying my invention. Fig. 2 is a section taken at right angles to Fig. 1, so as to show the damper. Figs. 3 and 4 show modifications.

A represents the cylinder, which is of any desired width or depth, and to which the two revolving heads B are applied, and held in position by means of the pivotal bolt C, which passes through them both. The outer edges of the two heads are flanged, as shown, so as to keep over the edges of the cylinder, and thus form a tight joint. Upon this pivotal bolt, in between the two heads, is placed a spiral spring, D, which serves to force the two heads outward at their centers, and thus cause a greater pressure at their outer edges against the edges of the cylinder. Through each one of the heads is made an opening to receive the end of a stove-pipe. As the heads can be turned freely around upon the cylinder, the openings for the stove-pipes can be brought in any desired relation to each other. When these revolving heads are turned so as to bring the openings for the stove-pipes upon opposite sides of the center of the cylinder, the ends are separated to the greatest possible distance, and thus a long elbow is formed. When the heads are turned so as to bring the openings nearer together, the cylinder forms but a short elbow. The great advantage in the construction above described consists in enabling an elbow to be formed just the length that is required for the purpose of joining the pipes together. At the same time a heating-drum is formed, which assists in heating the apartment. Inside of this drum is placed a pivoted damper, which sweeps through a portion of a circle, and which is made both to uncover an opening, O, made in one of the heads on the opposite side of its center, and at the same time to partially close the opening for the stove-pipe, and thus regulate the draft. When this damper is moved so as to partially uncover the opening I, the opening for the stove-pipe is correspondingly closed, and as fresh air flows through the opening O into the cylinder the draft of the stove is checked. By this means the heat can be controlled as readily as by a damper which is applied in the pipe or some portion of the stove itself.

If preferred, the cylinder may have one movable and one stationary head, and in that case the movable head alone will be adjusted to suit the length of the pipe; or the cylinder may be made in two parts which have their edges fastened together, so that one part can be turned upon the other.

Having thus described my invention, I claim—

1. An elbow for stove-pipes, consisting of a cylinder, in combination with movable heads having openings for the ends of the stove-pipes, whereby the openings can be brought in any desired relation to each other, substantially as shown.

2. In an elbow for stove-pipes, the combination of the cylinder, the two revolving heads provided with openings for the stove-pipes, and a means for holding the heads in place upon the cylinder, substantially as described.

3. The combination of the cylinder, the two revolving heads, the pivotal bolt, and a spring which is placed upon the bolt in between the two heads, substantially as set forth.

4. The combination of the cylinder, the revolving heads applied thereto and provided with openings for the stove-pipes, and means for holding the heads in position upon the cylinder, and a damper which is applied to one of the heads, substantially as shown and described.

5. An elbow for stove-pipes, consisting of a cylinder having an opening for the end of the stove-pipe, in combination with a revolving head, also having an opening for the end of the stove-pipe, substantially as shown.

6. An elbow for stove-pipes, which is composed of two heads, which are loosely connected together with a flue-space between them, and both provided with an opening or collar for the attachment of one part of the stove-pipe, one or both of the heads being adapted to be revolved or turned upon the other for the purpose of changing the relation of the openings I to each other, substantially as shown.

In testimony whereof I affix my signature in presence of two witnesses.

ALONZO W. CRAM.

Witnesses:
WILLIAM H. MOODY,
W. G. GREENMEN.